United States Patent [19]
Lopez et al.

[11] 4,265,155
[45] May 5, 1981

[54] SLITTER HAVING PIVOTAL MULTIPLE SPACED PAIRS OF ARBORS

[75] Inventors: Esteban Lopez, Chicago; Douglas Matsunaga, Vernon Hills, both of, IL

[73] Assignee: Braner Enterprises, Inc., Schiller Park, Ill.

[21] Appl. No.: 16,126

[22] Filed: Feb. 26, 1979

[51] Int. Cl.³ .......................... B23D 19/06; B26D 1/24
[52] U.S. Cl. ........................................ 83/479; 83/481; 83/564; 83/433
[58] Field of Search ................. 83/479, 433, 481, 563, 83/564

[56] References Cited

U.S. PATENT DOCUMENTS

| Re. 27,918 | 2/1974 | Montguire | 83/479 X |
|---|---|---|---|
| 3,426,634 | 2/1969 | Richel | 83/479 X |
| 3,727,503 | 4/1973 | Braner et al. | 83/479 |
| 4,212,218 | 7/1980 | Braner et al. | 83/479 |
| 4,226,151 | 10/1980 | Littley et al. | 83/479 |

*Primary Examiner*—Donald R. Schran
*Attorney, Agent, or Firm*—Oltsch, Knoblock & Hall

[57] ABSTRACT

A slitter having multiple spaced pairs of arbors supported for pivotal movement upon a frame. A drive located adjacent the pivot axis of the pairs of arbors is provided to make driving contact with one arbor of each of the arbor pairs as such pair of arbors is brought into and positioned across the passline of the slitter.

4 Claims, 6 Drawing Figures

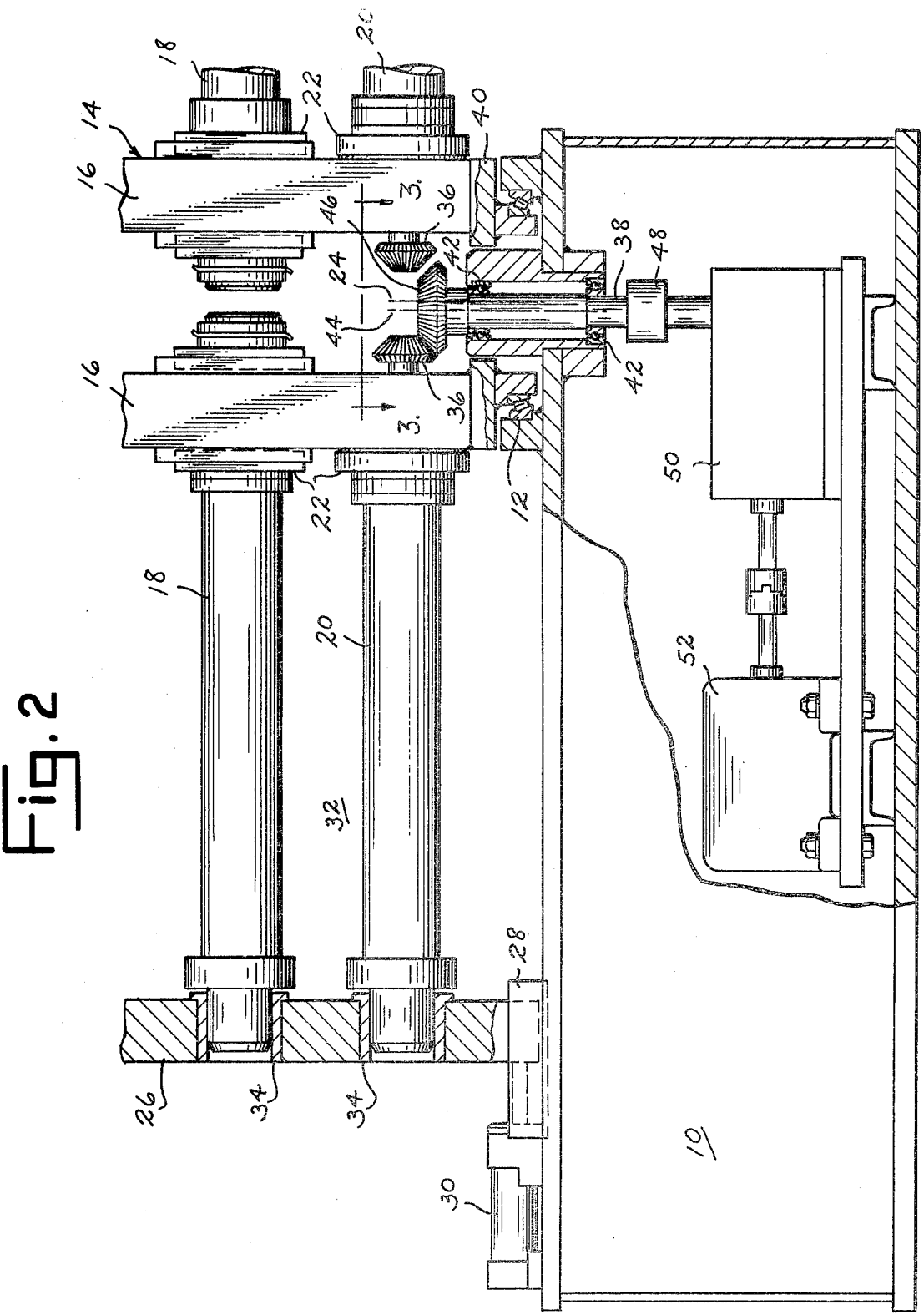

SLITTER HAVING PIVOTAL MULTIPLE SPACED PAIRS OF ARBORS

SUMMARY OF THE INVENTION

This invention relates to a slitter utilized for cutting coiled sheet material into strands of selected widths and will have particular application to that type of slitter having multiple spaced pairs of arbors pivoted about a central axis.

In the slitter of this invention, the multiple pairs of arbors are supported at one end by a bearing housing or support which in turn is supported for pivotal movement about a vertical axis relative to the frame of the slitter. A motor actuated drive is provided at the vertical pivot axis of the multiple pairs of arbors and includes drive parts for making driving engagement with one arbor of a selected pair of arbors when such pair of arbors is positioned so as to extend across the material passline for the slitter. In this manner, the slitter may have one pair of arbors performing a slitting operation while another pair of arbors may be set up and assembled with cutters in preparation for a subsequent slitting operation.

This invention would have application to the general slitter design shown in U.S. Pat. No. 3,727,503 in which the outboard bearing housing of the slitter is mounted to the slitter frame for supporting contact with a selected pair of arbors when such arbors are positioned across the material passline. Additionally, this invention would have application to the general slitter design shown in U.S. Pat. No. Re. 27,918 and in doing so would simplify, as well as make more economic, the construction of such a slitter.

Accordingly, it is an object of this invention to provide a slitter carrying a plurality of spaced pairs of arbors each being pivotal into an operative slitting position and being driveable by a center drive.

It is another object of this invention to provide a slitter having multiple spaced pairs of arbors, each being pivotally shiftable about a central vertical axis into supporting contact with a bearing housing carried by the slitter frame and into driving contact with a motor means located at said vertical pivot axis.

Still another object of this invention is to provide a slitter of economical construction and which includes spaced pairs of arbors pivotally supported for rotative movement about a central vertical axis near which is located a drive mechanism for rotating at least one slitter arbor as that arbor extends across the material passline of the slitter.

Other objects of this invention will become apparent upon a reading of the invention's description.

BRIEF DESCRIPTION OF THE DRAWINGS

FIG. 2 is a fragmentary elevational view of the embodiment of the slitter shown in FIG. 1 with portions broken away for purposes of illustration.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

Figure 1:
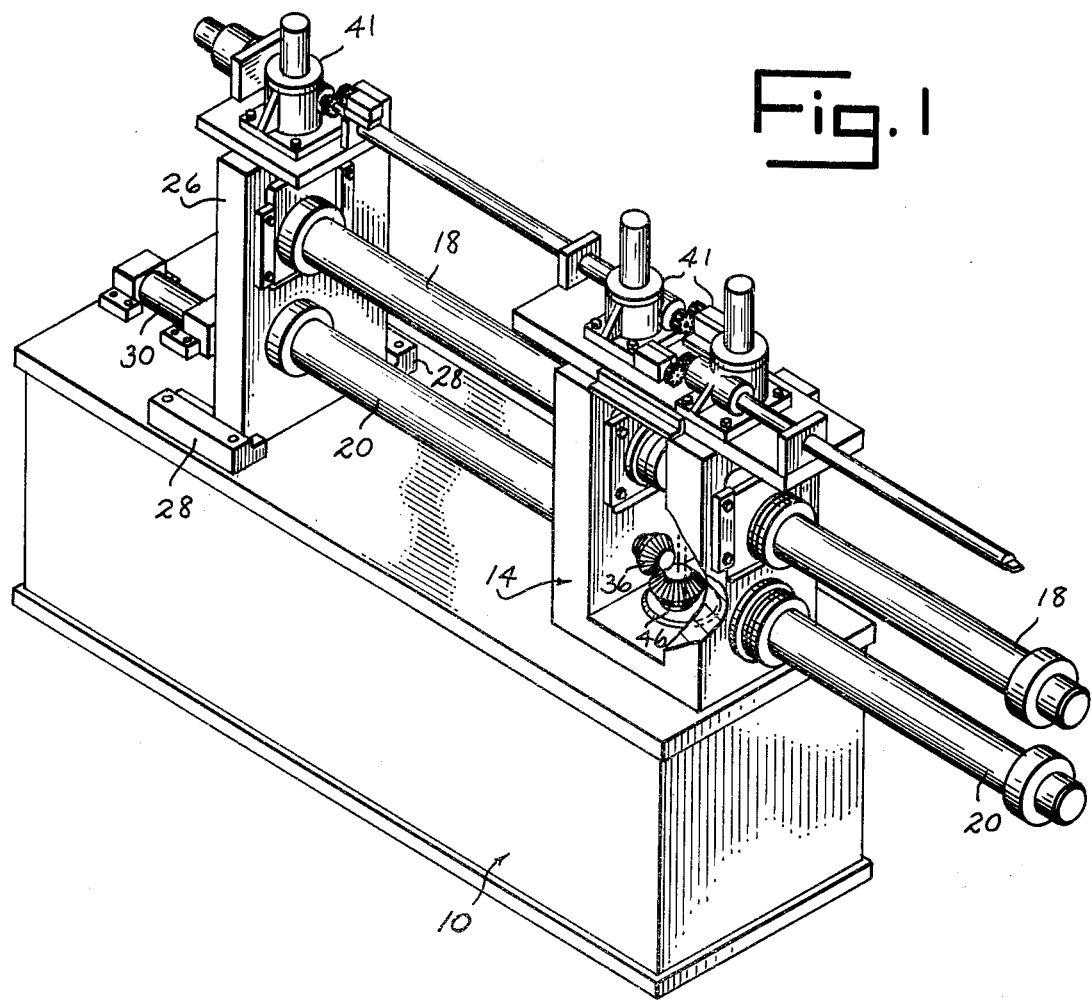
FIG. 1 is a perspective view of one embodiment of this invention.
Figure 3:
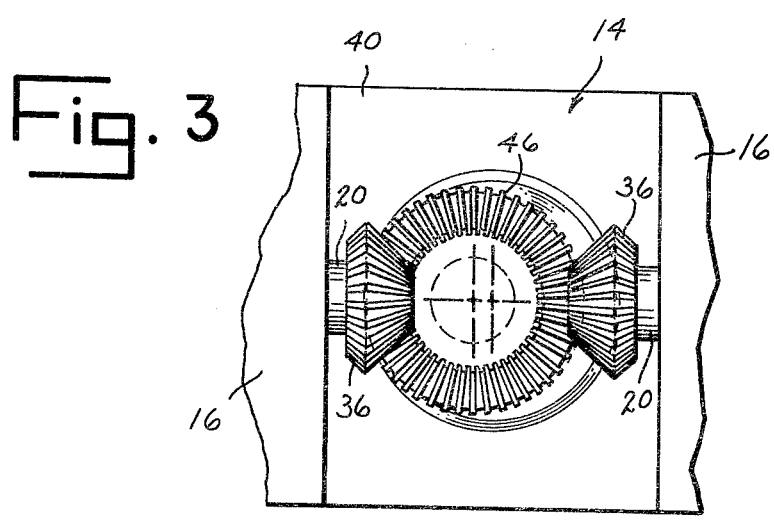
FIG. 3 is a fragmentary view as seen from line 3—3 of FIG. 2.

The slitter illustrated in FIGS. 1-3 includes a base or frame 10 to which is mounted a bearing member 12 carrying a center support 14. Support 14 includes a plurality of bearing housings 16. Each bearing housing 16 supports in cantilevered fashion a pair of arbors 18, 20 each journaled at one end to the bearing housing by a bearing 22. Support 14 and its supported pairs of arbors 18,20 are rotatable about a vertical pivot axis 24 relative to frame 10.

Frame 10 also carries an outboard bearing housing 26 supported upon guide members 28 for lateral movement toward and away from support 14. This movement of bearing housing 26 is caused by an actuator 30 which may be a hydraulic or pneumatic piston and cylinder. With bearing housing 26 shifted away from support 14 or in its retracted position, support 14 may be rotated, such as by hand, to swing and position a selected pair of arbors 18,20 across the passline of the material for the slitter, designated generally by the reference numeral 32. Actuator 30 is then activated to shift bearing housing 26 towards support 14 and into its extended position, causing the free ends of aligned arbors 18,20 to be journaled within bearings 34 of the bearing housing as illustrated in the FIGS. 1 and 2. When a selected pair of arbors 18,20 is so supported by bearing housing 26, such pair of arbors may be utilized in the current slitting operation while one of the remaining pairs of arbors may be set up and assembled with cutters and spacers for the next or succeeding slitting operation. Bearings 34 of bearing housing 26 serve only to support journaled arbors 18,20 for rotative movement during the slitting operation.

Arbor 20 of each of the pairs of arbors extends through its supporting bearing 22 and has a bevel gear 36 connected to it. When driven, bevel gear 36 serves to rotate connected arbor 20. A drive shaft 38 is carried by slitter frame 10. Drive shaft 38 is vertically oriented and extends through base 40 of support 14, terminating between bearing housings 16. Bearing members 42 support drive shaft 38 for rotative movement about a vertical axis 44 relative to frame 10 and support 14. Axis 44 of drive shaft 38 is offset towards bearing housing 26 of the slitter from pivot axis 24 of support 14. A bevel gear 46 is carried by drive shaft 38 between bearing housings 16 and is positioned so as to engage the gear 36 connected to arbor 20 of that pair of arbors positioned across material passline 32, as best illustrated in FIG. 2. When bearing housing 26 is shifted into its retracted position and support 14 is rotated about its pivot axis 24, gear 36 of another pair of arbors 18,20 will be brought into driving engagement with gear 46 as that pair of arbors is positioned across the passline of the slitter and aligned with bearing housing 26. Shaft 38 is connected through an overriding clutch 48 to a gear reducer 50.

Gear reducer 50 is in turn drive-connected to a motor 52. Actuation of motor 52 serves to rotate drive shaft 38, which in turn rotates the arbor 20 connected by intermeshing gears 36 and 46. Gear box 50 and motor 52 are located within frame 10 of the slitter.

The power drive provided by drive shaft 38 to an arbor 20 as it extends across the passline of the slitter and is supported by bearing housing 26 serves to help pull the coiled material through the cutter assemblies carried upon the arbors. Additionally, such power drive to the arbor can serve to assist in the cutting operation with overriding clutch 48 permitting free running of the arbor should the speed of the take-up roller or recoiler of the slitter assembly exceed that of the driven speed of the arbor.

In the illustrated embodiment of FIGS. 1–3 the cutter assemblies carried upon arbors 18,20 are not shown but it is to be understood that such assemblies will be so utilized during the actual slitting operation. The numbers of pairs of arbors carried by support 14 can vary depending upon the size of the slitter and the operational capacity desired for the slitter. The aforedescribed eccentric drive may also be utilized to rotate the type of slitter arbors shown and described in U.S. Pat. No. Re. 27,918. Additionally, it is to be understood that the described arbors and cooperating bearing housings 16 and 26 are associated with the usual jack screw devices 41 which serve to shift arbor 18 relative to arbor 20 and thus provide an adjustment for spacing between the arbors to allow for the assembly of the cutters and spacers and to set the cutter overlaps.

Figure 4:
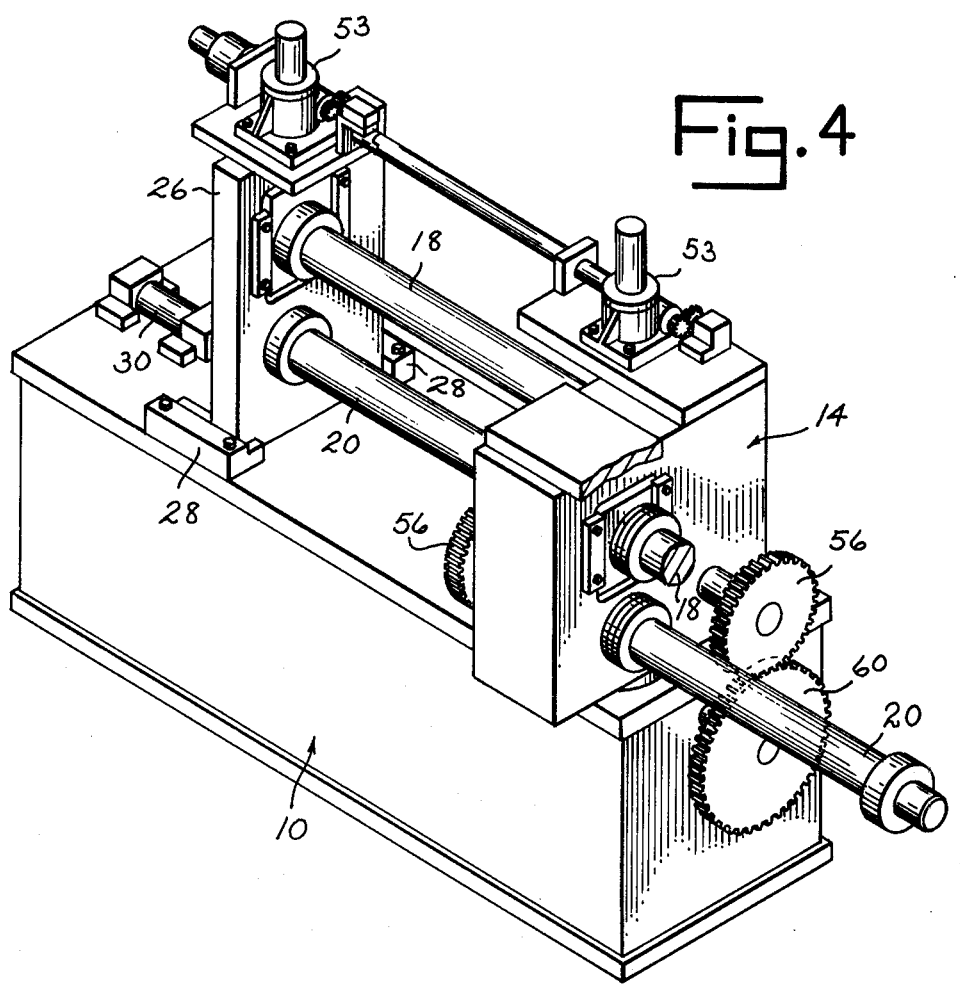
FIG. 4 is a perspective view of another embodiment of this invention shown with portions broken away for purposes of illustration.
Figure 5:
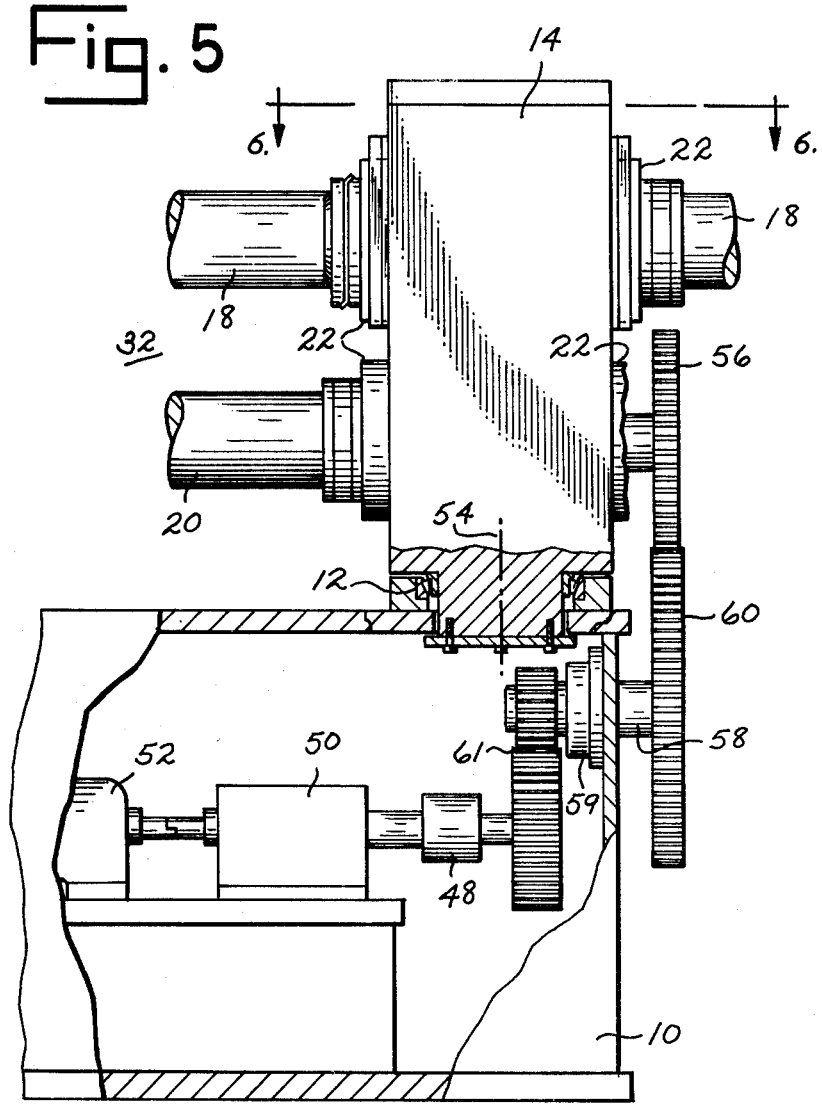
FIG. 5 is a fragmentary elevational view of the embodiment of FIG. 4 having portions thereof broken away for purposes of illustration.
Figure 6:
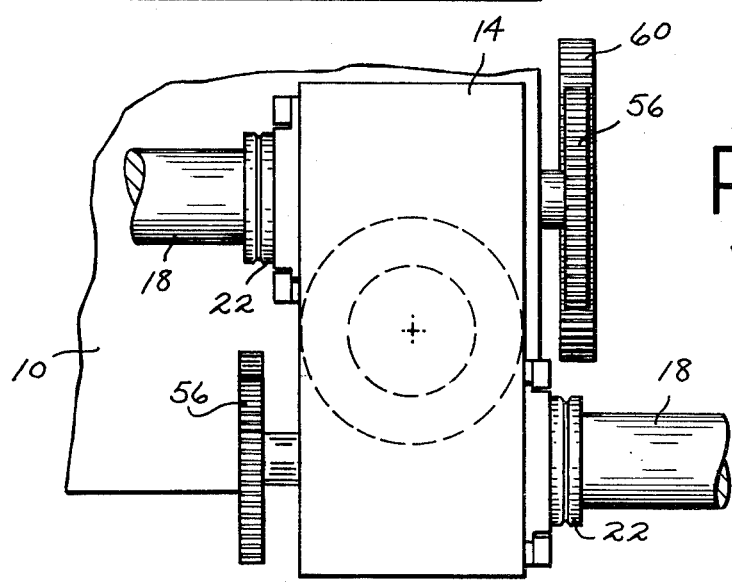
FIG. 6 is a fragmentary plan view as seen from line 6—6 of FIG. 5.

The embodiment of the slitter illustrated in FIGS. 4–6 includes frame 10, support 14 and outboard bearing housing 26 supported upon guides 28. Bearing housing 26 is shiftable between retracted and extended positions, away from and toward support 14, through actuator 30. Support 14 journals two pairs of arbors 18,20 extending in opposite directions from the support in parallel fashion. Support 14 is supported for rotation about a vertical axis 54 relative to frame 10 through bearing member 12. Each pair of arbors 18,20 are journaled within support 14 by bearings 22.

Arbor 20 of each pair of arbors extends through support 14 and carries a pinion type gear 56. A horizontal drive shaft 58 is carried by frame 10 with the end of the shaft protruding through a bearing 59 from the frame and carrying a drive gear 60. Drive shaft 58 is connected by suitable gearing 61 through an overriding clutch 48 to a gear reducer 50 and motor 52. Clutch 48, gear reducer 50 and motor 52 are all housed within frame 10. Gear 60 is positioned so that as support 14 is rotated about its pivot axis 54 and a selected pair of arbors 18,20 is brought into alignment with bearing housing 26 across the passline 32 of the slitter, gear 56 of such selected pair of arbors intermeshes with gear 60. In this manner, with bearing housing 26 shifted into its extended position towards support 14 and journaling the selected pair of arbors 18 and 20, rotation of drive shaft 58 and gear 60 will cause rotation of arbor 20. Thus arbor 20 can be utilized to assist in feeding the coiled sheet material through the slitter to the recoiler. Although not shown, it is to be understood that arbors 18 and 20 will be fitted with cutter assemblies for use in the slitting operation. Jack screws 53 are utilized in their customary manner to vary the spacing between each pair of arbors 18,20.

It is to be understood that the invention is not to be limited to the details above given but may be modified within the scope of the appended claims.

What we claim is:

1. In a slitter having multiple spaced pairs of arbors, a frame, a support carried upon said frame, means mounting said support for rotation relative to said frame, said pairs of arbors journaled at one end to said support, a bearing housing spaced from said support and carried by said frame, each pair of arbors being alignable with said bearing housing upon pivotal movement of said support, said bearing housing being shiftable toward and away from said support, the other end of each pair of arbors being journaled within said bearing housing when said arbors are aligned with said bearing housing and the bearing housing shifted toward said support, the improvement comprising drive means at said support for rotating at least one of the arbors of each pair of arbors when journaled in said bearing housing.

2. In a slitter having multiple spaced pairs of arbors, a frame, a support carried upon said frame, means mounting said support for rotation relative to said frame about a first vertical axis, said support including a plurality of bearing housings arranged in a radially spaced relationship from said first axis, each pair of arbors being journalably supported at corresponding end portions by a said bearing housing, one arbor of each pair of arbors having an end portion extending through its supporting bearing housing and terminating in a driven part located adjacent said first axis, the improvement comprising a vertical drive shaft carried by said frame, means mounting said shaft for rotation relative to said frame about a second vertical axis, said second axis located between said bearing housings and being offset from said first axis, motor means for rotating said shaft, said shaft carrying a drive part means for engaging each driven part to rotate the connected arbor thereof when such arbor is positioned across the material passline upon rotation of said support about said first axis.

3. The slitter of claim 2 and including an outboard bearing housing, said outboard bearing housing carried by said frame, means for shifting said outboard bearing housing toward and away from said first mentioned bearing housings, each pair of arbors being alignable with said outboard bearing housing upon rotation of said support, the outer ends of each pair of arbors being journaled within said outboard bearing housing when said arbors extend across said material passline in alignment with said outboard bearing housing and the outboard bearing housing is shifted toward said first mentioned bearing housings.

4. The slitter of claim 2 wherein each of said driven part and drive part means is a gear.

* * * * *